United States Patent [19]

Taylor, II

[11] Patent Number: 5,087,116
[45] Date of Patent: Feb. 11, 1992

[54] REFLECTIVE IMAGE DISPLAY INCLUDING A FIRST MIRROR AND A FRESNEL MIRROR

[75] Inventor: Roy Y. Taylor, II, Scottsville, N.Y.

[73] Assignee: Eastman Kodak Company, Rochester, N.Y.

[21] Appl. No.: 559,026

[22] Filed: Jul. 27, 1990

[51] Int. Cl.⁵ .................... G02B 17/06; G02B 27/02; G02B 5/10
[52] U.S. Cl. ..................................... 359/851; 359/857
[58] Field of Search ............... 350/618, 623, 624, 613, 350/452, 600, 619, 630

[56] References Cited

U.S. PATENT DOCUMENTS

| | | | |
|---|---|---|---|
| 426,869 | 4/1890 | Simon | 350/618 |
| 1,053,650 | 2/1913 | Saalburg | 350/619 |
| 3,222,986 | 12/1965 | Altman | 88/24 |
| 3,363,506 | 1/1968 | Altman | 88/24 |
| 3,690,240 | 9/1972 | Gold | 95/42 |
| 3,926,509 | 12/1975 | Davies et al. | 350/619 |
| 4,006,971 | 2/1977 | Plummer | 350/293 |
| 4,636,050 | 1/1987 | Tohata et al. | 353/66 |
| 4,717,248 | 1/1988 | LaRussa | 350/618 |

FOREIGN PATENT DOCUMENTS 2724845 12/1978 Fed. Rep. of Germany ...... 350/623
132907 11/1978 German Democratic Rep. .

OTHER PUBLICATIONS

An Article, R. E. Hopkins, pub. Optical Engineering Design, Dec. 1988, vol. 23, No. 12, pp. 1019-1026.
W. T. Plummer, Applied Optics, Jan. 1982, vol. 2, No. 2.
Display Systems Engineering, published by McGraw-Hill, 1968.

*Primary Examiner*—Jon W. Henry
*Attorney, Agent, or Firm*—Svetlana Z. Short

[57] ABSTRACT

An image display system is designed to provide a magnified presentation of the object for direct visual viewing with emphasis on low distortion and high apparent brightness. The image display system comprises two optical components: a concave Fresnel mirror surface and a second planar mirror surface, each coated with highly reflective material. Because there are two reflections in the optical path between the eye and the object, the presentation will be erect and right reading. The use of metallic coating will assure a high gain transfer of optical radiation from the object to the eye.

16 Claims, 3 Drawing Sheets

0
REFLECTIVE IMAGE DISPLAY INCLUDING A FIRST MIRROR AND A FRESNEL MIRROR

CROSS-REFERENCE TO A RELATED APPLICATION

Reference is made to commonly assigned copending patent application Ser. No. 539,025, filed Jul. 27, 1990 in the name of Roy Y. Taylor and entitled METHOD OF GENERATING FRESNEL MIRRORS SUITABLE FOR USE WITH IMAGE DISPLAY SYSTEMS.

BACKGROUND OF THE INVENTION

1. Field of the Invention

The subject invention relates generally to image display systems used to magnify the appearance of planar objects for viewing by the eye. The objects could include, but are not exclusive to photographic slides and prints, printed text, video and LCD screens, and holograms.

2. Description Relative to the Prior Art

Various types of optical apparatus have been employed in prior art systems for magnifying the appearance of objects for viewing. Devices such as magnifying lenses have been used to enlarge the appearance of photographic slides, printed text, and other objects which are rendered more intelligible or enjoyable when viewed through these devices. These devices are characterized by a variety of problems which limit their effectiveness. Simple magnifying lenses have limited angular fields of view and are subject to becoming quite massive. Also, such lenses are characterized by increasing distortion and color fringing as magnifying power and field of view increase. Other devices which correct for distortion and color fringing have increasing numbers of complex parts and require careful alignment during assembly.

Concave reflective mirrors are used in a variety of imaging systems at object distances ranging from finite to infinite. However, in order for the image to be focused on the retina of the eye, it is necessary either to provide a screen so located that the optical rays reflected from the mirror surface will form an image at which the eye can be directed or, to utilize a second optical element to redirect the optical rays in essentially parallel or slightly diverging paths. A second problem which is presented by a reflecting optical element is that the optical path on the object side of the surface and the optical path on the image side traverse the same physical space. Therefore, if the mirror is used in an on-axis mode of operation, it is not possible to place one's eye into a position necessary to see the image without obscuring the object. It is possible to somewhat lessen this problem by inserting a small supplemental plane mirror close to the image plane of the reflective mirror element, so arranged to reflect the image in a direction essentially normal to the axis of revolution of the conic section defined by the concave mirror. However, a small mirror utilized in this fashion, while obscuring the object path to a lesser degree, limits the angular field of view of the optical system.

An alternate solution, shown in FIG. 1 A-C, that utilizes an off-axis use of a concave mirror has been described in technical literature and is termed a specular display, (pp. 205-209, *Display Systems Engineering*, edited by H. R. Luxemberg and Rudolph L. Kuehn, McGraw-Hill 1968). In this description, a concave mirror, preferably an ellipsoid is arranged with its major axis approximately normal to the object and image paths. A projector using a refractive lens to project the object is placed at one of the foci and the eye is located at the other focus of the ellipsoidal mirror as shown in FIG. 1 of the drawings hereof, illustrating prior art. This system, as well as a binocular version, are shown in FIGS. 6.27–6.29 and at page 208 of the above-mentioned book. The text also suggests that, given the difficulty of fabricating an ellipsoid, a spherical mirror can be used if all the image-forming rays meet the surface of the mirror at an incidence close to normal. If a spherical surface is used in this way it necessitates that the object and image space be displaced in opposite directions from the center of curvature of the spherical mirror.

A device utilizing an off-axis specular display is also disclosed in U.S. Pat. No. 3,296,509, which describes a double reflection viewing instrument. When used monocularly, this device utilized two mirrors, at least one of which is described as a curved magnifying mirror. Consequently, the two reflections cause negating image reversals and the image seen will be right-viewed. The flexibility of rotating the planar mirror may have some advantages in scanning a document with multiple lines of printed information, but does not fix the configuration of the components in an optimized manner for minimum distortion of accommodation correction. A perplexing problem brought about by the description of this device is the focal length of the curved magnifying mirror so described. If an optical ray calculation is made from the user's vantage point for parallel rays extending toward the curved magnifying mirror, they will be found to focus at a point essentially half-way between the curved mirror surface and the center of curvature. If the printed material is located as shown in the drawings, including a reflection off of the second mirror so described, the rays emanating from the object would be converging as they entered the viewer's eye and could not be accommodated to focus on the retina without an additional optical component. The problem would be further perturbated by the substitution of a second concave mirror, as described, to increase the magnification. When used binocularly, the number of components is doubled and the complexity of the design increases to assure alignment of the two ocular paths to each other.

A patent further developing the off-axis specular display condition is U.S. Pat. No. 4,717,248 which describes a video display device. This device utilizes a plane mirror to reflect the image onto the spherical mirror, which is subsequently viewed by the eye and is right-viewed. Although it is suggested that certain angular adjustments can be made to the video tube to eliminate trapezoidal error in the image, a careful analysis can be made which shows that residual pyramidal error remains which cannot be eliminated by tilting the object plane. The pyramidal error arises from the stereoscopic effect when the two eyes focus on images seen from opposite sides of the spherical mirror's optical axis, wherein a flat object grid appears to be humped in the middle in an unreal and misleading manner. This pyramidal error becomes a practical limitation to the magnifying power which otherwise could be increased by shortening the radius of curvature or placing the object closer to the conjugate focus of the eye position.

The performance of this device also depends on the production of a fairly large aperture spherical mirror of reasonably good figure of merit which is inherently difficult to make and correspondingly expensive. The optimum shape for the aperture of the spherical mirror would be a rectangle with sides proportionally equivalent to the format of a rectangular video tube. The problems of grinding and polishing a spherical surface onto a rectangular lens blank or of cutting down a round mirror to a rectangular one further add to production difficulties. A casting or injection molding process is also difficult to maintain without generating obvious localized surface distortions.

Concave Fresnel mirrors have been used in applications described in the prior art. U.S. Pat. Nos. 3,222,986 and 3,363,506 describe the optical principle of retroreflecting a light source back to a means for projecting an image onto a viewing screen. A usual type of overhead projector manufactured by various companies utilizes a concave Fresnel mirror in this fashion as the field lens to approximately retroreflect light from a source located adjacent to a projection lens. The light is reflected back to the entrance pupil of the projection lens, which is focused on the transparency located in near proximity of the Fresnel mirror. The Fresnel mirror is not used to create an image of the transparency in this application, but directs the light to the projection lens. A Fresnel mirror as disclosed in U.S. Pat. Nos. 3,222,986 and 3,363,506 is used in a different configuration than in an overhead projector of the present invention and does not provide for the correction of image distortions or binocular viewing.

U.S. Pat. No. 4,636,050 also utilizes a concave Fresnel mirror as a obliquely located field lens to image the filament of the light source at the entrance pupil of a projection lens. Several configurations are described, but none of them utilize the said Fresnel mirror as an imaging device in itself.

The East German Patent No. DL-132,907 describes a concave Fresnel viewing screen mirror which is placed at the image plane of a slide transparency projection reader to direct the light in a specular fashion toward the eyes of the user at an oblique angle. However, the Fresnel mirror is used as a high gain obliquely-viewed screen. Because the profitability of manufactured products is often limited by the complexity of the product design, it is desirable to minimize the number of components required to build the product. The image displayed will have distortion and other aberrations inherent in the actual projection lens used and the correction of which will drive the projection lens costs up. A device which does not require a projection lens will be inherently less complex and potentially more profitable.

SUMMARY OF THE INVENTION

This invention relates to a means, incorporating a Fresnel mirror, to provide an angularly magnified view, i.e., a formed image is virtual and an object appears to subtend a larger angle with low distortion of an object such as a slide transparency, a photograph, a small video or liquid crystal display screen, printed text, a holograph or other objects which a viewer may wish to observe in a comfortable and unobtrusive manner. The image display system will present the viewer with a right-reading erect view of the object which therefore does not require any external optical devices to reverse the image appearance before its presentation to this invention. Few components are required to construct the invention and the components are highly manufacturable.

This invention achieves its desired objects by utilizing a minimal number of essential components comprised as follows:
(a) a first mirror;
(b) a second Fresnel mirror having converging power, wherein the optical axis of the Fresnel mirror is located near the edge of the Fresnel mirror that is positioned nearest to the first mirror.

For purposes of this application a mirror has converging power when a collimated light beam incident on it is focused to a point image, i.e., the mirror forms a real image.

The mirrors are positioned to receive light from the object and reflect it from one mirror to the other and then into the eye of a viewer, resulting in erect and a magnified image of the object. In addition, the image display system will have the same means for supporting the object and a frame to mount the above-mentioned components in the proper configuration to each other and to other hardware in which the invention may be incorporated. The image display system may also include a set of opaque baffles arranged to block external stray light from interfering with the observer's viewing of the image.

Further advantages and novel features of my invention will become apparent from consideration of the drawings and the ensuing description thereof.

DETAILED DESCRIPTION OF THE PREFERRED EMBODIMENT

Figure 1A:
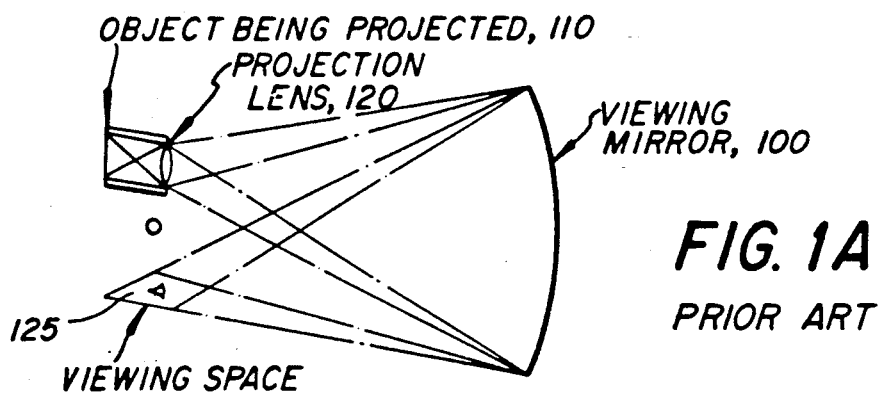
FIG. 1 A-C is a representation of a specular display described in the prior art.
Figure 1B:
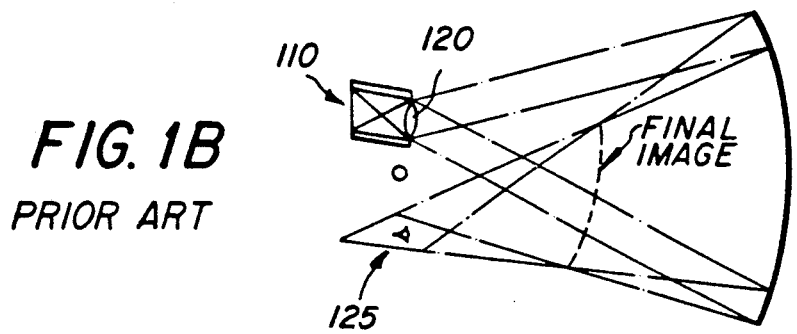
Figure 1C:
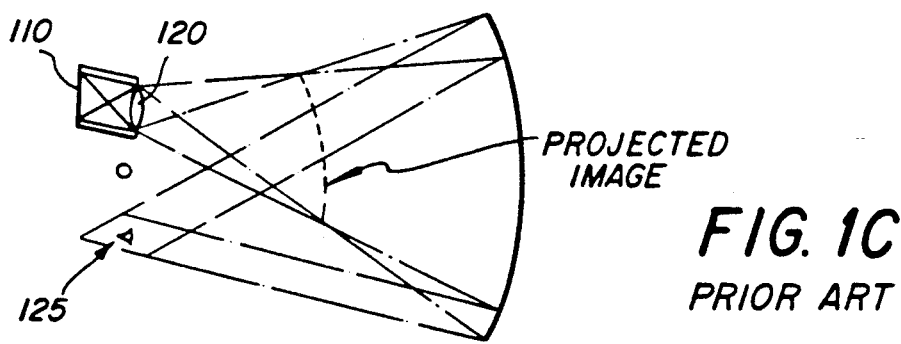
Figure 2:
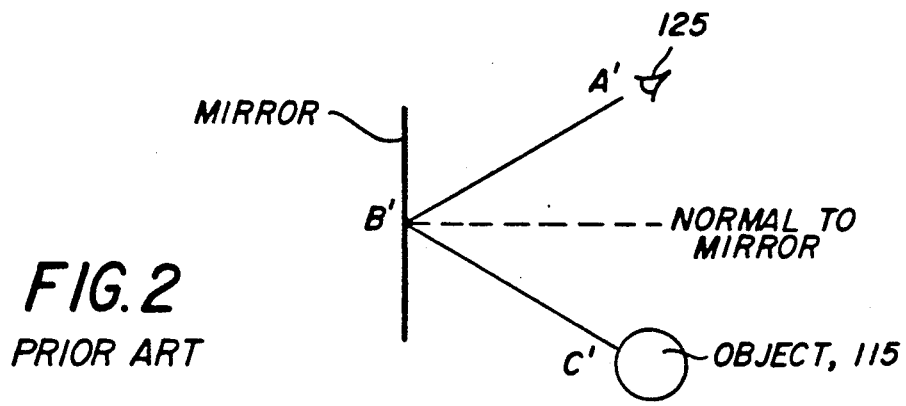
FIG. 2 is a representation of a "directerix" from an observer's eye reflected off of a prior art planar mirror to an object point.

A term which is helpful in describing an image display as visually used is "directerix". a directerix has a close relationship to the vector defining the line of site. A "directerix" from the eye is a chain of optical vectors extending from the center of the eye in that direction, which the viewer is gazing to the point on an object. Similarly, a "directerix" from the object point is a chain of optical vectors extending from the point of interest to the center of the eye. This is shown in FIG. 2 using the reflection off a planar mirror. Being optical vectors, "directerixes" will also conform to the principles of refraction and reflection. When the eye is gazing at point C' on the object, the "directerix" path is <A'-B'-C'>. The concept of "directerix" control can be applied to the design of a Fresnel reflector. Specifically, if the slopes of the facets of the Fresnel reflector are calculated to exactly reflect each "directerix" from a regular grid of points placed in the object plane to a common vantage point for a user's eye while using the device, pyramidal error can be greatly reduced and system magnification increased. The generation traditional methods of grinding and polishing associated with spherical optical surfaces, and its mathematical description would not fit the conic equation family.

This surface will be a spherical in nature and can be generated by a method described in a copending U.S. patent application Ser. No. 559,025, filed Jul. 27, 1990 in the name of Roy Y. Taylor entitled METHOD OF GENERATING FRESNEL MIRRORS SUITABLE FOR USE WITH IMAGE DISPLAY SYSTEMS, and is hereby incorporated by reference.

Figure 3:
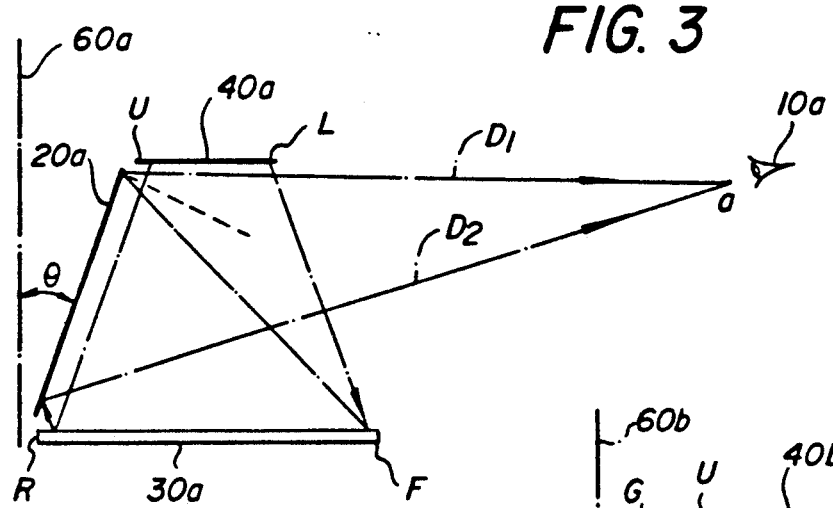
FIG. 3 is a side view of a first illustrative preferred embodiment of the invention.
Figure 8:
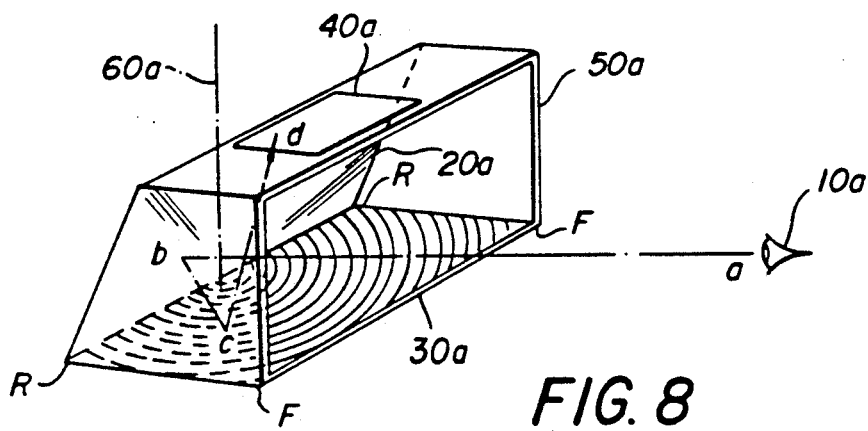
FIG. 8 is a perspective view of the preferred embodiment.

A first preferred embodiment is shown in FIG. 3 and FIG. 8. The image display projects an image of an object surface 40a to a position for viewing by an eye 10a. The object surface 10a has a primary edge U and a secondary edge L. The term "primary" edge refers to that edge of the object surface 40a from which a directrix $D_2$ to the eye is reflected from the edge of the Fresnel mirror 30a nearest the plane mirror 20a, while the opposite edge of the object is referred to as a "secondary edge." Therefore, the secondary edge L is that edge of the object surface 40a from which a directrix $D_1$ to the eye is reflected from that edge of the Fresnel mirror 30a which is furthest from the plane mirror 20a.

A planar mirror 20a is located at an edge R of a positive Fresnel mirror 30a. The edge R is also adjacent to the axis of revolution or optical axis 60a of mirror 30a. Mirror 20a is inclined forward toward the eye 10a at an angle $\theta$ and reflects "directerix" $D_1$ issued from a secondary edge L of the object surface 40a and reflected from a forward edge F of the Fresnel mirror 30a in a direction approximately parallel to the plane of the object surface 40a. While the object surface 40a is shown parallel to the Fresnel mirror plane 30a, it may, in some applications, be at a slight angle to the Fresnel mirror plane 30 when viewed from the side. Because "directerixes", e.g. $D_1$ and $D_2$, from the object surface 40a to the Fresnel mirror 30a, to the planar mirror 20a and to observation point a at the eye 10a from various parts of the object surface 40a are visible in a uniformly distributed and spatially correlated manner over the aperture of the Fresnel mirror, the image appears larger than the object. The size of the image is determined by the power of the Fresnel mirror and by the object's size and the object's distance.

FIG. 8 shows the essential components of the invention. The "directerix" <a-b-c-d> is directed from the observation point a at the eye 10a toward point b on the planar mirror 20a, to point c on the Fresnel mirror 30a and to point d at the object 40a. The framework 50a serves to maintain the alignment between the planar mirror 20a, the Fresnel mirror 30a, and the object 40a, as well as to support the object and to shield the components from stray external light which might cause particles or other defects on the reflecting surfaces to become distracting. The inside of the framework 50a is typically painted black or includes baffles to absorb light that enters the viewing aperture.

Figure 4:
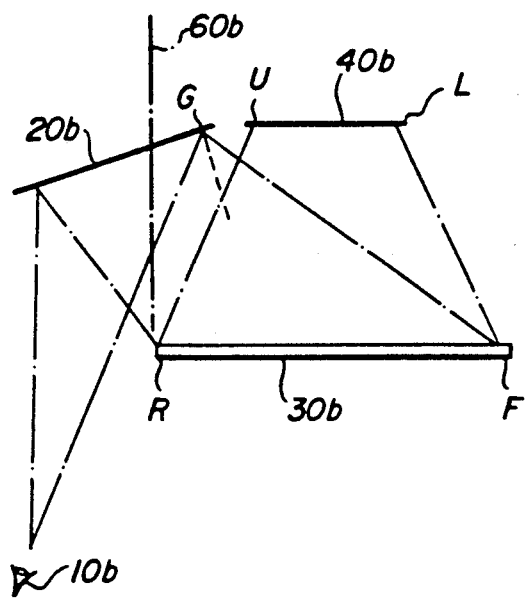
FIG. 4 is a side view of a second illustrative preferred embodiment of the invention.

FIG. 4 illustrates a second embodiment of the present invention which is generally similar in construction to the first embodiment described above and illustrated in FIG. 3. In FIG. 4, the optical components are given the same reference numbers as optical components of the first embodiment but with the letter "b" suffix. As in the case of the first embodiment, in this second embodiment the rays issued from the object surface 40b first intercept the positive Fresnel mirror 30b, and then after reflection from the Fresnel mirror 30b, reflect from the second mirror 20b before being intercepted by the eye 10b. However, in the second embodiment the location of the second mirror 20b and the location of the observer's eyes 10b are different than those of the first embodiment. The planar mirror 20b is located near the object surface 40b and over the rear edge R of the positive Fresnel mirror 30b. It is inclined toward the eye at an angle such that directerixes issued from the primary edge U of the object surface to the rear edge R of the Fresnel mirror 30b are reflected in a plane approximately parallel to the plane established by directerixes issued from the eye to the edge G of the second mirror surface.

Figure 6:
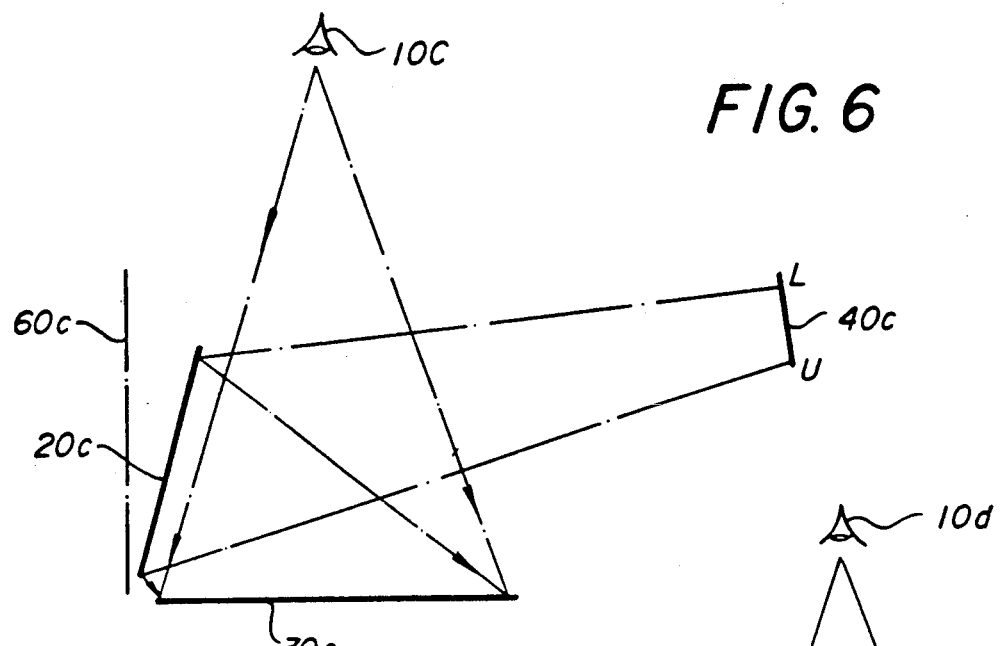
FIG. 6 is a side view of a third illustrative embodiment of the invention.

The third preferred embodiment is shown in FIG. 6. The optical components of the third illustrative embodiment are given the same reference numbers as in the first embodiment, but with the letter "c" suffix. This third embodiment is very similar to the first illustrative embodiment shown in FIG. 3, but the location for the object surface 40c and the observer's position 10c are reversed.

Figure 7:
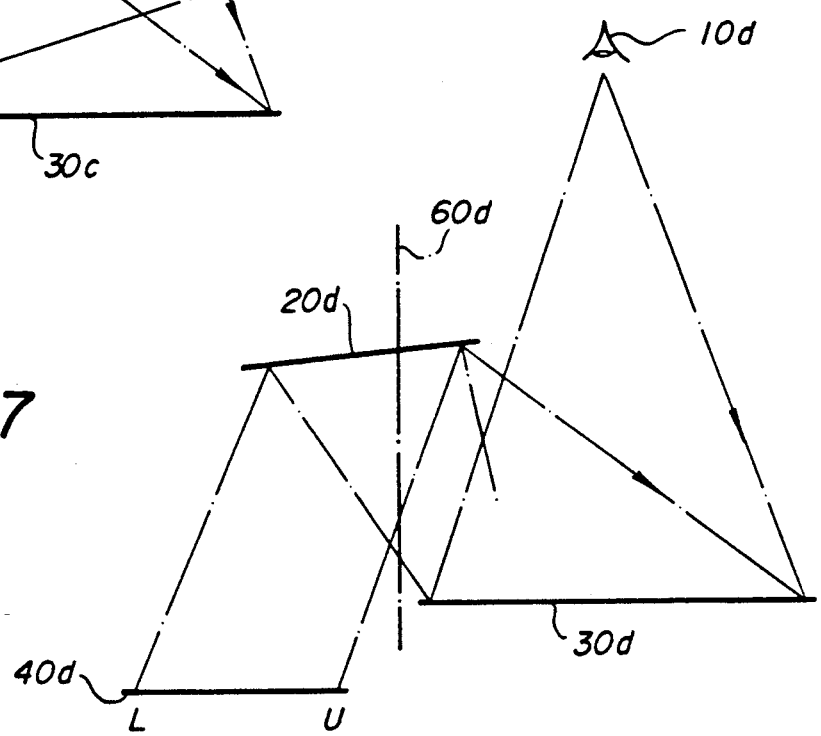
FIG. 7 is a side view of a fourth illustrative embodiment of the invention.

Similarly, the fourth embodiment (FIG. 7) is most similar to the second embodiment, with the exception of the object surface 40d position and the observer's position 10d. The position of the object surface 40d and the observer's position 10d are the reverse of those shown in FIG. 4.

Figure 5A:
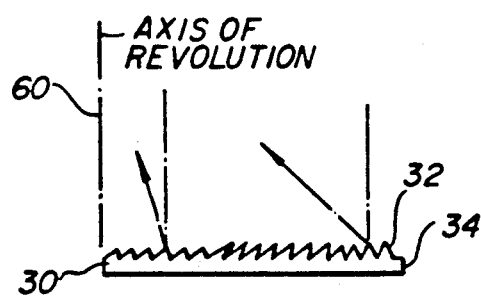
FIGS. 5a to 5b are close-up side views of "directerixes" reflected off a Fresnel mirror when the Fresnel surface is on the first side and second side of the part, respectively.
Figure 5B:
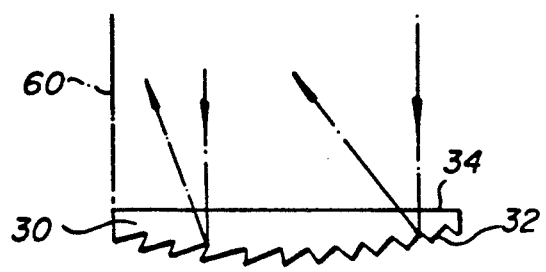

FIGS. 5a and 5b show that the Fresnel mirror 30 may be used with its faceted surface 32 facing up as shown in FIG. 5a, or, down as shown in FIG. 5b, when used with the above-described embodiments of the present invention. The Fresnel surface may also be, a conic surface or of generalized aspheric form to further correct pyramidal error. In addition, the second mirror 20 can also be a Fresnel mirror. In this way, the power of the total system may be shared between the two Fresnel mirrors, and accordingly, some of the aberrations may be corrected more easily.

From the foregoing description of the illustrative preferred embodiments, it will be recognized that there are four configurations of the invention resulting from the combinations of two considerations as follows:

(a) the order of components transversed by the directerixes path from the object to the eye is either:
  (i) the object, the planar mirror, the Fresnel mirror, and the eye;
  (ii) the object, the Fresnel mirror, the planar mirror, and the eye; or
(b) the viewer's face is located in a plane;
  (i) roughly parallel to the plane in which the object surface is located; or
  (ii) roughly perpendicular to the plane in which the object surface is located.

The first illustrative embodiment (FIG. 3) represents a combination of a(i) and b(i); the second illustrative embodiment (FIG. 4) represents a combination of a(ii) and b(i); the third illustrative embodiment (FIG. 6) represents a combination of a(ii) and b(ii) and the fourth illustrative embodiment (FIG. 7) represents a combination of a(i) and b(ii).

Obviously, a skilled designer can reduce the number of separate components required by combining the functions of the several components in the final design. For example, the object support, the frame, and the opaque baffles used for stray light rejection could easily be combined into one part, which might be conducive to injection molding. It is also possible to substitute a grooved planar mirror for the flat planar mirror, or to split the optical power between the two mirrors while retaining the overall configuration shown in the above illustrative embodiments.

While the above description contains many specificities, these should not be construed as a limitation on the scope of the invention, but rather as examples of preferred embodiments thereof.

The invention has been described in detail with particular reference to a presently preferred embodiments, but it will be understood that variations and modifications can be effected within the spirit and scope of the invention.

What is claimed is:

1. A reflective image display for forming a viewable, virtual, right reading image of a planar object positioned at an object position, said display comprising:
   a first mirror; and
   a second, Fresnel mirror, said second mirror having converging power, an optical axis, and opposite edges, one of said edges being nearer the first mirror than the other edge and said optical axis being adjacent to said one edge, said first and second mirrors being positioned to receive light from the object, positioned at said object position, without having any intervening lens elements located therebetween, wherein said light is reflected off one mirror to the other mirror and then into the eye of a viewer to provide an erect magnified virtual image of said object to said viewer.

2. A reflective image display according to claim 1, wherein the plane of the said first mirror is approximately parallel to directerixes issued from a primary edge of the object to the edge of the said Fresnel mirror which is nearest to the surface of said first mirror.

3. A reflective image display according to claim 1, wherein the plane of the said first mirror is essentially parallel to directerixes issued from a primary edge of the object and reflected from the edge of the said Fresnel mirror which is nearest to the surface of said first mirror.

4. A reflective image display according to claim 1, wherein the plane of said first mirror is oriented such that directerixes issued from the primary edge of the object to the edge of the said Fresnel mirror which is nearest to the said first mirror surface are located in a plane approximately parallel to the plane established by directerixes issued from the eye to that edge of the surface of said first mirror which is nearest to said Fresnel mirror.

5. A reflective image display according to claim 1, wherein the plane of said first mirror is oriented such that directerixes issued from the secondary edge of the object to the edge of the said first mirror which is nearest to said Fresnel mirror are located in a plane approximately parallel to the plane established by directerixes issued from the eye to the edge of said Fresnel mirror which is nearest to said first mirror.

6. A reflective image display according to claim 1 or 2, wherein directerixes issued from the eye are reflected off said first mirror before intercepting the said Fresnel mirror.

7. A reflective image display according to claim 4, wherein directerixes issued from the eye are reflected off the said first mirror before intercepting the said Fresnel surface.

8. A reflective image display according to claim 1 or 3, wherein directerixes issued from the eye are reflected off the said Fresnel mirror before intercepting the said first mirror.

9. A reflective image display according to claim 4, wherein directerixes issued from the eye are reflected off the said first mirror before intercepting the said Fresnel mirror.

10. A reflective image display according to claim 5 wherein the directerixes issued from the eye are reflected off the said Fresnel mirror before intercepting the said first mirror.

11. A reflective image display according to claim 1, wherein said first mirror is a planar mirror.

12. A reflective image display according to claim 1, further having first means for supporting said object and second means for supporting said object and said mirrors in operative relation to one another.

13. A reflective image display for forming a viewable, virtual, right reading image of a planar object positioned at an object position, said display comprising:
    a first mirror; and
    a second, Fresnel mirror, said second mirror having converging power, an optical axis, and opposite edges, one of said edges being nearer the first mirror than the other edge and said optical axis being adjacent to said one edge, said first and second mirrors being positioned to receive light from an object, positioned at said object position, wherein the light from said object impinges upon said Fresnel mirror without previously passing through a lens element, reflects off said Fresnel mirror towards said first mirror and then reflects from said first mirror towards the eye of a viewer to provide an erect magnified virtual image of said object to said viewer.

14. A reflective image display according to claim 13 wherein said first mirror is tilted with respect to said second mirror.

15. A reflective image display according to claim 13, wherein the plane of the said first mirror is approximately parallel to directerixes issued from a primary edge of the object to the edge of the said Fresnel mirror which is nearest to the surface of said first mirror.

16. A reflective image display according to claim 13, wherein said first mirror is a planar mirror.

* * * * *

UNITED STATES PATENT AND TRADEMARK OFFICE
CERTIFICATE OF CORRECTION

PATENT NO. : 5,087,116

DATED : February 11, 1992

INVENTOR(S) : Roy Y. Taylor, II

It is certified that error appears in the above-indentified patent and that said Letters Patent is hereby corrected as shown below:

Col. 1, Line 8  "539,025" should read as --559,025--.

Col. 5, Line 4  after the word "generation", the following should have been inserted, --of this surface could not be accomplished by the--.

Signed and Sealed this

Twenty-second Day of March, 1994

Attest:

BRUCE LEHMAN

Attesting Officer   Commissioner of Patents and Trademarks

UNITED STATES PATENT AND TRADEMARK OFFICE
CERTIFICATE OF CORRECTION

PATENT NO. : 5,087,116

DATED : February 11, 1992

INVENTOR(S) : Roy Y. Taylor, II

It is certified that error appears in the above-indentified patent and that said Letters Patent is hereby corrected as shown below:

| | |
|---|---|
| Col. 1, Line 67 | after the word "concave", the word --viewing-- should be inserted. |
| Col. 1, Line 68 | after "ror", the numeral --100-- should be inserted. |
| Col. 2, Line 2 | after the word "lens", the numeral --120-- should be inserted. |
| Col. 2, Line 3 | after the word "object", the numeral --110-- should be inserted. |
| Col. 2, Line 3 | after the word "eye", the numeral --125-- should be inserted. |
| Col. 4, Line 58 | after the word "point", the numeral --115-- should be inserted. |
| Col. 4, Line 60 | after the word "eye", the numeral --125-- should be inserted. |

Signed and Sealed this

Sixth Day of December, 1994

Attest:

BRUCE LEHMAN

Attesting Officer     Commissioner of Patents and Trademarks